(12) United States Patent
Fiedrich (10) Patent No.: US 6,330,980 B1
(45) Date of Patent: Dec. 18, 2001

(54) DRY INSTALLATION OF A RADIANT FLOOR OR WALL HYDRONIC HEATING SYSTEM, METAL RADIATING PLATES THAT ATTACH TO THE EDGES OF SIDE-BY-SIDE BOARDS AND PROVIDE METAL SLOTS FOR HOLDING HOT WATER TUBING

(76) Inventor: Joachim Fiedrich, 20 Red Pine Rd., Carlisle, MA (US) 01741

( * ) Notice: Subject to any disclaimer, the term of this patent is extended or adjusted under 35 U.S.C. 154(b) by 0 days.

(21) Appl. No.: 09/185,165

(22) Filed: Nov. 3, 1998

Related U.S. Application Data (60) Provisional application No. 60/064,022, filed on Nov. 3, 1997.

(51) Int. Cl.[7] ........................................ F24D 5/10
(52) U.S. Cl. .................................. 237/69; 165/53
(58) Field of Search ................................ 237/69; 165/56, 165/171, 53, 55

(56) References Cited

U.S. PATENT DOCUMENTS 3,366,170 * 1/1968 Welz .................................... 237/69
5,788,152 * 8/1998 Alsberg ................................ 237/69

* cited by examiner

*Primary Examiner*—Denise L. Ferensic
*Assistant Examiner*—Derek S. Boles
(74) *Attorney, Agent, or Firm*—Robert T. Dunn, Esq.

(57) ABSTRACT

In a hydronic heating system including a heating element that is a length of tubing that conducts water and is against a radiating metal plate, all mounted in a floor, wall or ceiling, the element being held by two spaced apart providing an elongated space for holding the tubing adjacent the plate, the metal plate is in two separate pieces that are attached to an edges of the spaced apart boards and combine when they abut each other at installation to provide a metal groove into which the tubing is inserted and held snugly with a substantial part of the tubing in direct intimate thermal contact with the metal.

20 Claims, 7 Drawing Sheets

DRY INSTALLATION OF A RADIANT FLOOR OR WALL HYDRONIC HEATING SYSTEM, METAL RADIATING PLATES THAT ATTACH TO THE EDGES OF SIDE-BY-SIDE BOARDS AND PROVIDE METAL SLOTS FOR HOLDING HOT WATER TUBING

The applicant herein claims the benefit under 35 USC 119(e) of the applicant's U.S. provisional application No. 60/064,022 filed on Nov. 3, 1997.

BACKGROUND OF THE INVENTION

This invention relates to hydronic heating systems for dwellings, offices, etc. having heating loops that consist of tubing or pipes held in the floor or walls of a room by radiation panels that contain a metal radiation plate that radiates heat to heat the room, the tubing being secured in the panels in intimate thermal contact with the metal radiation plate; and, more particularly, where the metal plate is in two parts that attach to the edges of side-by-side boards and provide the radiation plate and a metal slot into which the tubing is inserted and held in thermal contact with the plate.

Dry Modular Panel Radiant Floor and Wall Hydronic Heating

Radiant floor heating (RFH) and radiant wall heating (RWH) are techniques of heating rooms in a dwelling or commercial building for human and creature comfort. It is believed by many that radiant heating is the ideal way to warm the human body and superior to forced hot air heating.

Typical hydronic heating systems require a supply of hot water from a boiler and means for modulating the temperature of the water from the supply that is fed to the heating loops of the system, which include tubing and heating elements. This is particularly the case where modular panels are used in a dry installation on top of the floor for RFH or in the wall for RWH. For example, if the supply water temperature is 180° F. for laundry, it must be modulated to about 100° F. for RFH. A suitable system for reducing and controlling the supply water temperature for RFH is described in U.S. Pat. No. 5,119,988, issued Jun. 9, 1992, entitled "Hydronic Heating Water Temperature Control System, to Joachim Fiedrich, the inventor herein. In that patent a three-way, modulated diverting or by-pass valve is provided in the return line to the boiler, for diverting some of the cooler return water to the hot supply water to reduce the temperature of the supply water feeding the heating loop supply header. This is sometimes called temperature dilution and the diverting valve is modulated by a feedback signal derived from the diluted water temperature.

A modular panel heating element for RFH or RWH is described in U.S. Pat. No. 5,292,065, issued Mar. 8, 1994, entitled Radiant Floor And Wall Hydronic Heating Systems, to Joachim Fiedrich, the inventor herein. It includes a metal radiation plate or sheet attached to two spaced apart boards for holding the tubing in the space between the boards (the tube holding space) in intimate thermal contact with the radiation plate, so that the plate is heated by conduction of heat from the tubing, and the plate has a substantial radiating surface that radiates heat to the room.

Thermal conduction from the tubing to the plate and mechanical attachment of the tubing to the metal plate can be insured by a resilient thermally conductive filler material inserted in the tube holding space before the tubing is inserted as described in U.S. Pat. No. 5,579,996, issued Dec. 3, 1996, entitled Radiant Floor And Wall Hydronic Heating Systems, also to Joachim Fiedrich, the inventor herein.

Thermal conduction from the tubing to the plate is further enhanced by under cutting the boards at their spaced apart edges to widen the tube holding space at the plate and so increase the "thermal footprint" of the tubing on the radiation plate as described in pending U.S. application Ser. No. 08/500,069, filed Jul. 10, 1995, entitled "Radiant Floor And Wall Hydronic Heating System Tubing Attachment To Radiant Plate", by Joachim Fiedrich, the inventor herein.

The modular panel heating element described in the above mentioned U.S. patents and pending patent applications can be used to cool as well as heat. In some installations, cooling is done by feeding cool water to the tubing to reduce the temperature of the plate in the modular panel below room temperature so that heat flows from the room to the plate to the cool water, heating the water slightly and the water is then fed to a heat exchanger where it gives up the heat and is fed back to cool the panels. This circulation of cool water is continuous and may be a closed system. Several structures and adaptations of the RFH and RWH system for cooling are described in a U.S. Provisional Application No. 60/048,682, filed on Jun. 5, 1997, entitled Radiant Floor, Wall And Ceiling Hydronic Cooling System And Heating And Cooling Systems, All Using Metal Plates That Are Heated Or Cooled By Attached Tubing That Is Fed Hot Or Cold Water, by Joachim Fiedrich, the inventor herein. When used for cooling, the floor installation is called Radiant Floor Cooling (RFC), the wall installation is called Radiant Wall Cooling (RWC) and the ceiling installation is called (RCC). The floor installations are particularly effective for heating and can also be used for cooling, the ceiling installations are particularly effective for cooling and can also be used for heating and the wall installations are effective for both heating and cooling.

In any of the systems described in the aforementioned U.S. patents, patent applications and provisional applications, hot and/or cold spots on the surface of the finished floor, wall or ceiling that covers the modular panels sometimes occurs. These spots are identified as being hotter during heating or cooler during cooling than elsewhere on the finished surface, whereas uniform surface temperature is preferred. Cold spots on the finished covering during cooling can be particularly troublesome, because when the temperature of the cold spot falls below the dew point in the room, undesirable condensation occurs on the surface. Techniques of eliminating or reducing such hot or cold spots are described in pending U.S. patent application Ser. No. 80/862,441, filed May 23, 1997, entitled For Radiant Floor, Wall And Ceiling Hydronic Heating And/Or Cooling Systems Using Metal Plates That Are Heated Or Cooled By Attached Tubing That Is Fed Hot Or Cold Water, Techniques Of Improving Performance And Avoiding Condensation When Cooling, by Joachim Fiedrich, the inventor herein. The systems described in that application include floor, wall and ceiling installations of modular panel elements and tubing.

In all of the above mentioned U.S. patents, patent applications and provisional applications, in which the modular panel consists of two spaced apart holding boards that hold the metal radiation plate and the plate is a unitary piece that attaches to both boards and so fixes the uniform space between the boards into which the tubing is inserted so that it is in intimate thermal contact with the plate. Several of the structures described in the above mentioned patents and applications of the inventor herein are shown in FIGS. A to H herein, denoted Prior Art.

Two types of modular panels are shown in FIGS. A to H, The first type, shown in FIGS. A to D, has a flat plate or sheet of aluminum attached to one side of the two spaced apart boards. This type of modular panel can be attached to the top of the sub-floor, as shown in FIGS. A and B and the tubing inserted into the tube holding space from the top and after insertion of the tubing in the panels, a finished wall or ceiling can be installed; or it can be attached to the bottom of the sub-floor between the floor joists as shown in FIGS. C and D and the tubing inserted into the tube holding space from beneath (from the floor below). The attachment to the bottom of the sub-floor is often preferred where an finished floor is already in place and/or where the added thickness dimension of the panels on top of the sub-floor cannot be tolerated.

The second type of modular panel, shown in FIGS. E to H, has a grooved plate or sheet of aluminum attached to one side of the spaced apart boards with the metal groove projecting into the spacing between the boards, (the tube holding space). This type of modular panel can be attached to the top of the sub-floor, as shown in FIGS. E and F and the tubing inserted into the metal groove from the top; or it can be attached to the bottom of the sub-floor between the floor foists as shown in FIGS. G and H and the tubing inserted into the metal groove from beneath (from the floor below). The preference for one or the other also depends on whether a finished floor is already in place and/or where the added thickness dimension of the panels on top of the sub-floor cannot be tolerated.

Both types of these Prior Art modular panels can also be mounted to a wall or a ceiling, in which case, the elongated space between the boards and/or the metal groove in the plate, (herein called the tube holding space) into which the tubing is inserted, provides access for the insertion on the room side of the wall or ceiling so that the tubing can be inserted from that side after the panels are attached to the wall studs or the ceiling rafters. After insertion of the tubing in the panels, a finished wall or ceiling can be installed.

As mentioned above, in all of these Prior Art modular panels, the unitary piece metal plate or metal sheet is fixedly attached to the two spaced apart boards to provide the modular panel ready for installation side by side and end to end on or under a sub-floor or on a wall or ceiling for heating or for cooling the room.

The inventor herein has found a need for an installation in which the boards are provided in situs and in which all pairs of boards may not be the same width and/or length or even where the width of the metal radiation plate may not be the same for all courses of the inserted tubing.

To satisfy these needs and to provide greater versatility and selections of installations, the inventor herein has conceived and made metal plate structures in two separate pieces that are each attached to an edge of a board of the pair of spaced apart boards at installation. The boards may be different lengths and widths, but must be all the same thickness. The two separate parts of the metal plate may provide radiating surfaces of different widths and/or different lengths to match the boards. This allows the boards to be cut to suit at installation and the lengths of the two parts of the metal plate structure to be cut to suit at installation.

In addition, the two parts of the plate structure, each attached to the edge of a board, combine when they abut each other at installation to provide a metal groove or slot into which the tubing is inserted and held snugly with a substantial part of the tubing outside surface in direct intimate thermal contact with the metal.

SUMMARY OF THE INVENTION

It is an object of the present invention to provide metal parts for "dry" installation of RFH, RWH, RCH, RWC and/or RCC in a hydronic heating and/or cooling system.

It is another object of the present invention to provide such an installation in which the boards may be provided in situs and in which all pairs of boards may not be the same width and/or length or even where the width of the metal radiation plate may not be the same for all courses of the inserted tubing.

It is another object of the present invention to provide greater versatility and selections for such installations.

It is another object of the present invention to provide the metal plate structures for such installations in two separate pieces that are each attached to an edge of a board of the pair of spaced apart boards at installation, wherein the boards may be different lengths and widths.

It is another object of the present invention to provide the metal plate structures for such installations in two separate pieces with radiating surfaces of different widths and/or different lengths to match the boards.

It is another object of the present invention to provide such metal plate structures that allow the boards to be cut to suit at installation and the lengths of the two separate pieces of the metal plate structure to be cut to suit at installation.

According to embodiments of the present invention, the metal plate structure is in two separate pieces that are each attached to an edge of a board of the pair of spaced apart boards at installation. The boards may be different lengths and widths, but must be all the same thickness. The two separate pieces of the metal plate may provide radiating surfaces of different widths and/or different lengths to match the boards, allowing the boards to be cut to suit at installation and the lengths of the two separate pieces of the metal plate structure to be cut to suit at installation.

In addition, the two separate pieces of the plate structure, each attached to the edge of a board, combine when they abut each other at installation to provide a metal groove into which the tubing is inserted and held snugly with a substantial part of the tubing outside surface in direct intimate thermal contact with the metal.

These and other objects and features of the present invention are apparent from the following descriptions of specific: embodiments of the invention described in conjunction with the drawings.

BRIEF DESCRIPTION OF THE DRAWINGS

FIG. A (Prior Art) is a perspective view of a modular panel of the first type which is an assembly of a metal radiation or heat transfer plate and holder boards according to the above mentioned U.S. Pat. Nos. 5,292,065 and 5,579,996, positioned for attachment to the top of a sub-floor.

FIG. B (Prior Art) is an enlarged end view showing the panel of the first type of metal radiation plate and holders with tubing inserted and adhered thereto with compliant thermally conductive filler material, on top of the sub-floor.

FIG. C (Prior Art) is a perspective view of a modular panel of the first type, positioned for attachment to the bottom of the sub-floor.

FIG. D (Prior Art) is an enlarged end view showing the panel of the first type attached to the bottom of the sub-floor between floor joists.

FIG. E (Prior Art) is a perspective view of a modular panel of the second type which is an assembly of a metal radiation or heat transfer plate having a metal groove and holder boards according to the above mentioned U.S. Pat. Nos. 5,292,065 and 5,579,996, positioned for attachment to the top of a sub-floor.

FIG. F (Prior Art) is an enlarged end view showing the panel of the second type of metal radiation plate and holders with tubing inserted in the metal groove on top of the sub-floor.

FIG. G (Prior Art) is a perspective view of a modular panel of the second type, positioned for attachment to the bottom of the sub-floor; and FIG. H (Prior Art) is an enlarged end view showing the panel of the second type attached to the bottom of the sub-floor between floor joists.

According to the present invention.

DESCRIPTION OF PRIOR ART

Tube Holding Modular Panels Of The First Type
Prior Art FIGS. A and B—Panels on Top Of The Sub-Floor A configurations of a module panel, which is an assembly of a radiation plate 12 and tube holding boards 16 and 17 is shown in FIGS. A and B. This configuration is also described in aformentioned U.S. patents, patent applications and provisional applications. This panel is shown in FIG. B on top the sub-floor 70 of a room for RFH. The holder boards 16 and 17 may be plywood, particle board or other rigid material that is not thermally conductive and preferably is the same thickness as the outside diameter of the tubing 1 that it holds. The two lengths 16 and 17 of wood holder boards of the panel hold the heat conduction and radiation plate 12 and provide the tube holding space 14, the length thereof for holding the tubing 1 against the plate 12.

As shown in FIG. B, the tube holding space 14 is the space between boards 16 and 17 and is closed on one side (the bottom side in this Figure) by the plate 12 and so the tubing must be inserted into this space from the top side of the space. Thus, the open end of the tube holding space 14 is separated from the sub-floor by the plate.

The plate is made of highly thermally conductive material such as aluminum, copper or steel. For example, it can be made of a relatively thin sheet of 0.008 gage, 3003 alloy aluminum; and is attached to holder boards 16 and 17 by a suitable glue or epoxy by nailing or stapling or by staking as described in pending U.S. application Ser. No. 08/746,458, filed Nov. 12, 1996 by the inventor herein. Plate 12 can also be made of heavier thermally conductive material so that it conducts heat from the tubing more readily.

Tube Holding Modular Panels Of The First Type
Prior Art FIGS. C and D—Panels Under The Sub-Floor An installation of the same modular panel as shown in FIGS. A and B installed under the sub-floor between floor joists in shown in FIGS. C and D, Here, as in FIGS. A and B, the assembly of a radiation plate 12 and tube holding boards 16 and 17 is attached to the bottom of the sub-floor 70 of a room for RFH.

In all other respects this kind of installation is the same as described above with respect to Prior Art FIGS. A and B, except the radiating plate is immediately against the bottom of the sub-floor instead of on top of it and the tubing is not against the finished floor that would be installed, but is separated from the finished floor by the sub-floor. This installation eliminates any likelihood of hot spots in the finished floor that occur with installations as in FIGS. A and B.

Tube Holding Modular Panels Of The Second Type
Prior Art FIGS. E and F—Panels On Top Of The
Sub-Floor A configurations of a modular panel, which is an assembly of a radiation plate 33 and tube holding boards 31 and 32 is shown in FIGS. E and F. This configuration is also described in the above mentioned U.S. patents and patent applications. This panel is shown in FIGS. E and F is installed on top the sub-floor 70 of a room for RFH. The holder boards 31 and 32 may be plywood, particle board or other rigid material that is not thermally conductive and preferably is the same thickness as the outside diameter of the tubing 1 that it holds.

The two lengths 31 and 32 of spaced apart wood holder boards of the panel hold the heat conduction and radiation plate 33 and provide the tube holding space 37, the length thereof, into which a groove 34 in the metal plate projects, substantially filling the space between the boards. The tubing 1 is inserted into the metal groove 34 and fits snugly therein holding the tubing 1 against the metal of the plate in intimate thermal contact therewith. Structural rigidity and strength may be increased by webbing support 36 that is attached to the opposite side of both boards As shown in FIG. F, the tube holding space 37 is the space between boards 31 and 32 and is closed on one side (the bottom side in this Figure) by the plate groove 34 that projects into the space and so the tubing must be inserted into this space from the top side of the space. In this case, the metal radiation plate 33 is on top of the installation and so is immediately against the finished flooring and sometimes requires a thermal barrier as in the above mentioned pending U.S. patent application Ser. No. 08/862,441, filed May 23, 1997 by the inventor herein, to reduce hot spots in the finished flooring.

Here again, the metal plate is made of aluminum, copper or steel. For example, it can be made of a relatively thin sheet of 0.008 gage, 3003 alloy aluminum; and is attached to holder boards by a suitable glue or epoxy or by nailing or stapling or by staking as described in pending U.S. application Ser. No. 08/746,458, filed Nov. 12, 1996 by the inventor herein. Plate 33 can also be made of heavier thermally conductive material so that it conducts heat from the tubing more readily.

Tube Holding Modular Panels Of The Second Type
Prior Art FIGS. G and H—Panels Under The Sub-
Floor An installation of the same modular panel as shown in FIGS. E and F installed under the sub-floor between floor joists in shown in FIGS. G and H. Here, as shown in FIG. H, the assembly of a radiation plate 33 and tube holding boards 31 and 32 is attached to the bottom of the sub-floor 70 of a room for RFH.

In all other respects this kind of installation is the same as described above with respect to Prior Art FIGS. E and F, except the radiating plate is separated from the bottom of the sub-floor by the thickness of holder boards 31 and 32 and is further separated from the finished floor by the sub-floor. This installation completely eliminates any likelihood of hot spots in the finished floor that occur with installations as in FIGS. E and F.

DESCRIPTION OF EMBODIMENTS OF THE PRESENT INVENTION

First Type Of Metal Edge Pieces

Figure 1:
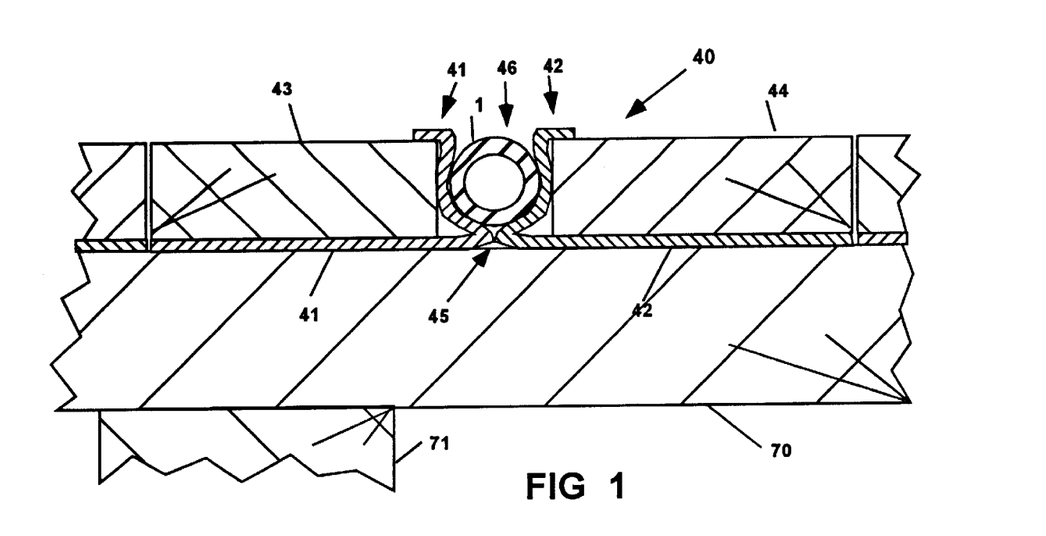
FIG. 1 is an enlarged end view of edge pieces of a first type of two piece metal radiation sheet that is formed of two matching edge pieces attached to side-by-side holder boards and with the edge pieces abutting each other and providing, in combination, a metal slot between the boards into which the tubing is inserted and held snugly, the installation being on top of a sub-floor.

FIG. 1 is an enlarged end view of edge pieces of a first type of two piece metal radiation sheet that is formed of two matching edge pieces 41 and 42 attached to side-by-side holder boards 43 and 44, respectively, and with the edge pieces abutting each other at 45 and providing, in combination, a metal groove 46 between the boards into which the tubing 1 is inserted and held snugly, the installation forming the modular panel 40 on top of a sub-floor 70. The sub-floor is supported by floor joists such as 71.

Figure 2:
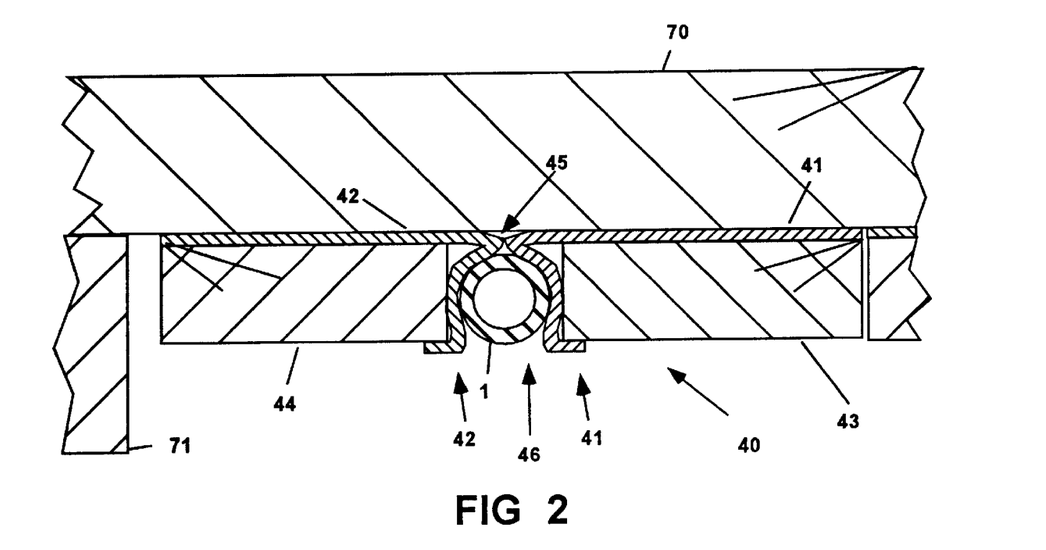
FIG. 2 shows the same first type of edge pieces as in FIG. 1 attached to side-by-side holder boards and with the edge pieces abutting each other and providing, in combination, a metal slot between the boards into which the tubing is inserted and held snugly, the installation being underneath the sub-floor between floor joists.

FIG. 2 shows the same first type of edge pieces as in FIG. 1 attached to side-by-side holder boards 43 and 44 and with the edge pieces 41 and 42 abutting each other at 45 and providing, in combination, a metal groove 46 between the boards into which the tubing 1 is inserted and held snugly, the installation forming the modular panel 40 underneath the sub-floor 70 between floor joists 71.

Figure 3:
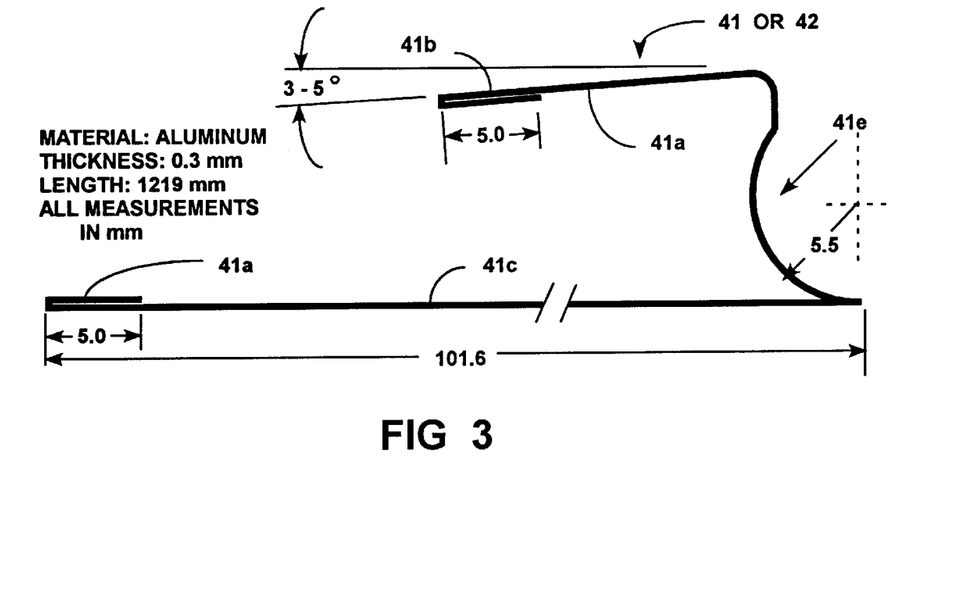
FIG. 3 is an edge view of an elongated metal sheet of aluminum that has been formed using sheet forming tools and special dies to provide an edge piece of the first type that is installed as described in FIGS. 1 and 2.

FIG. 3 is an end view of an elongated metal sheet of aluminum that has been formed using sheet forming tools and special dies to provide an edge piece of the first type that is installed as described in FIGS. 1 and 2 and denoted 41 and 42 therein. The material is aluminum stock as described in the figure and may be formed with the dimensions shown in millimeters (mm). The long edges such as 41a and 41b of the formed edge piece are folded double to add strength and rigidity to the piece. The radiation plate is for the most part provided by part 41c which measures 102 mm by 1219 mm for each four foot length of such edge piece. Part 41d is provided primarily as a spring that plays against the holder board to urge part 41c against the board so that the holder board is gripped by the edge piece and so it is secured to the board without further attachments. Part 41e is shaped to combine with the opposing edge piece to provide a snug fit for the tubing 1 that is inserted into the groove 46 that is formed at installation when the opposing edge pieces abut.

Second Type Of Metal Edge Pieces

Figure 4:
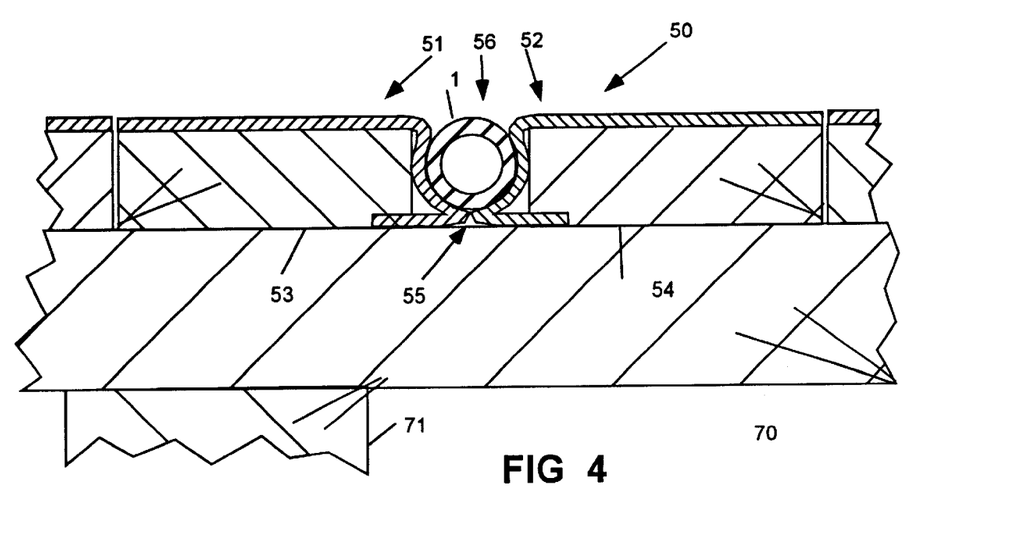
FIG. 4 is an enlarged end view of edge pieces of a second type of two piece metal radiation sheet that is formed of two matching edge pieces attached to side-by-side holder boards and with the edge pieces abutting each other and providing, in combination, a metal slot between the boards into which the tubing is inserted and held snugly, the installation being on top of a sub-floor.

FIG. 4 is an enlarged end view of edge pieces of a second type of two piece metal radiation sheet that is formed of two matching edge pieces 51 and 52 attached to side-by-side holder boards 53 and 54, respectively, and with the edge pieces abutting each other at 55 and providing, in combination, a metal groove 56 between the boards into which the tubing 1 is inserted and held snugly, the installation forming the modular panel 50 on top of a sub-floor 70, hich is supported by floor joists 71.

Figure 5:
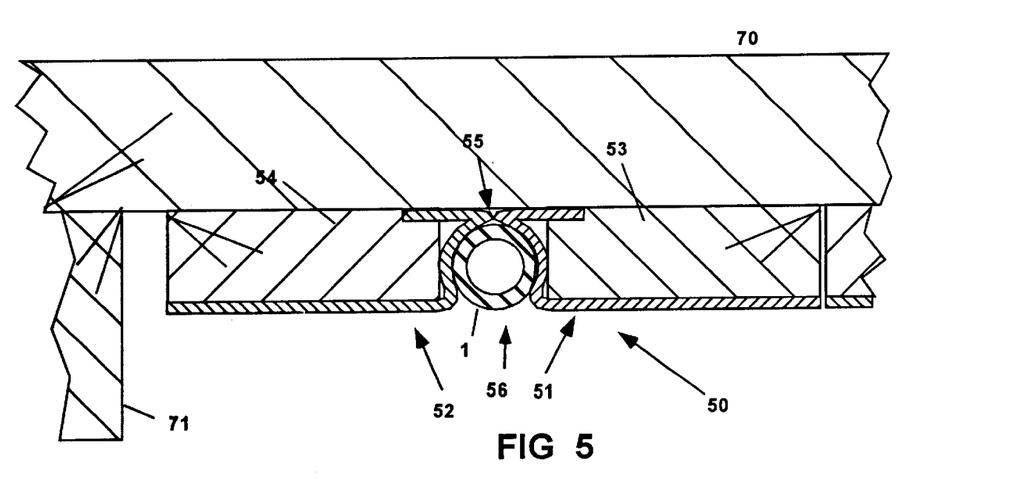
FIG. 5 shows the same second type of edge pieces as in FIG. 1 attached to side-by-side holder boards and with the edge pieces abutting each other and providing, in combination, a metal slot between the boards into which the tubing is inserted and held snugly, the installation being underneath the sub-floor between floor joists.

FIG. 5 shows the same second type of edge pieces as in FIG. 4 attached to side-by-side holder boards and with the edge pieces abutting each other at 55 and providing, in combination, a metal groove 56 between the boards into which the tubing 1 is inserted and held snugly, the installation forming the modular panel 50 underneath the sub-floor 70 between floor joists 71.

Figure 6:
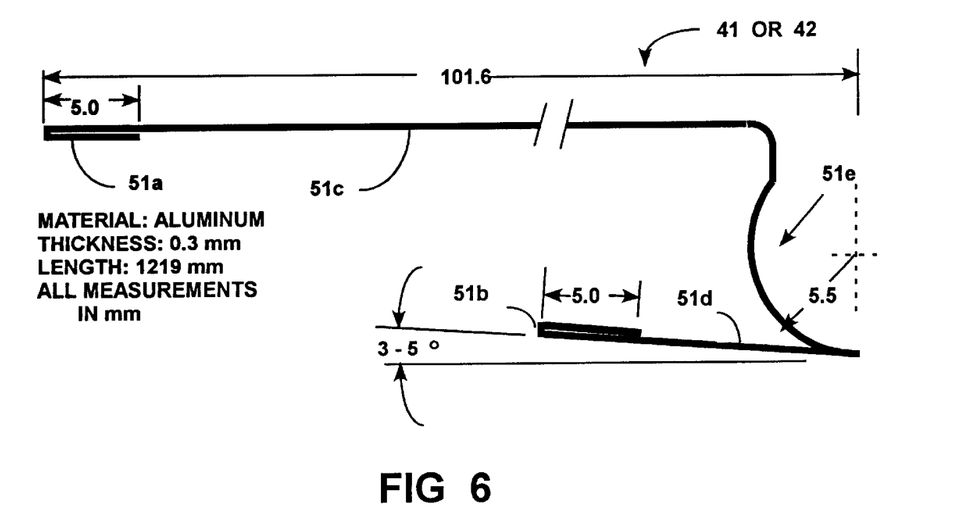
FIG. 6 is an edge view of an elongated metal sheet of aluminum that has been formed using sheet forming tools and special dies to provide an edge piece of the second type that is installed as described in FIGS. 4 and 5.

FIG. 6 is an end view of an elongated metal sheet of aluminum that has been formed using sheet forming tools and special dies to provide an edge piece of the second type that is installed as described in FIGS. 4 and 5 and denoted 51 and 52 therein. The material is aluminum stock as described in the figure and may be formed with the dimensions shown in millimeters (mm). The long edges such as 51a and 51b of the formed edge piece are folded double to add strength and rigidity to the piece. The radiation plate is for the most part provided by part 51c which measures about 102 mm by 1219 mm for each four foot length of such edge piece. Part 51d is provided primarily as a spring that plays against the holder board and so urges part 51c against the board so that the holder board is gripped by the edge piece and so it is secured to the board without further attachments. Part 51e is shaped to combine with the opposing edge piece to provide a snug fit for the tubing 1 that is inserted into the groove 56 that is formed at installation when opposing edge pieces abut.

RFH Installation—Tubing On Top Of The Sub-floor

Figure 7:
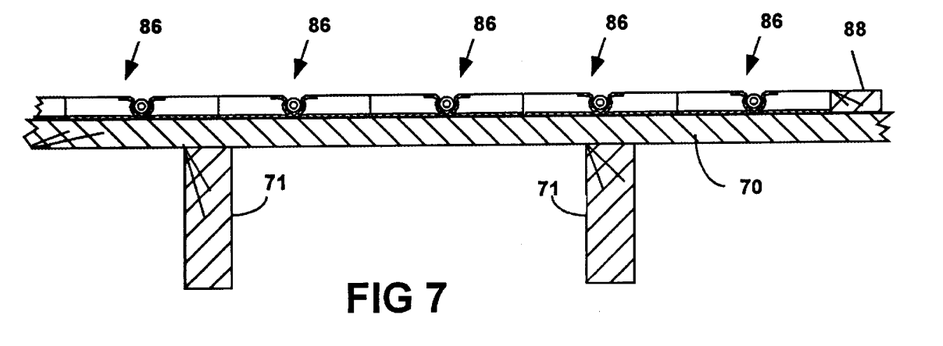
FIG. 7 is an end view of an RFH installation on top of the floor showing several of the courses of boards with edge pieces of the first type attached and arranged side by side and with the tubing inserted according to the steps shown in FIGS. 1 to 3.
Figure 8:
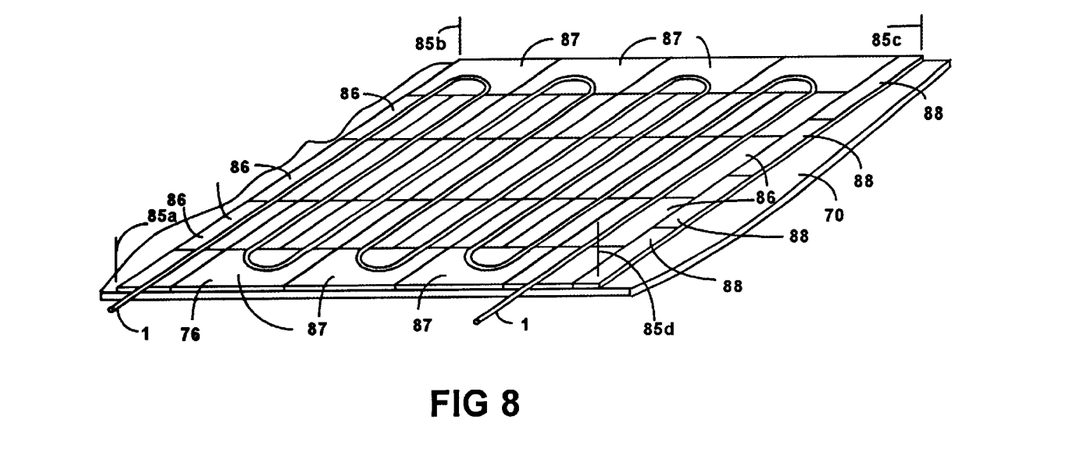
FIG. 8 is a perspective view of the RFH installation on top of the floor shown in FIG. 7.

An installation using metal edge pieces of the first type is shown by FIGS. 7 and 8. FIG. 7 is an end view of an RFH installation of courses of modular panels on top of the sub-floor using the first type of edge pieces. The courses of panels 86 on top of the sub-floor 70, are each an assembly of two holder boards and a metal radiation plate in two pieces, each piece being an edge piece attached to an edge of one of the boards or the course. These courses of panels are arranged side by side and end to end on the sub-flooring, on an area thereof in a room. Spacer boards 88 fill between or around the courses to bring the surface of the installation even for the finished floor covering.

FIG. 8 is a perspective view of the same room showing several of the courses of tubing holding panels 86 and 87 of different kinds (straight or 180° end turn), arranged side by side and end to end on the sub-floor 70 of the room over an area of the floor defined by vertical corner lines 85a to 85c. The courses of panels hold tubing 1 as a continuous length laid down serpentine fashion from course to course, embedded in the elongated grooves in the elongated spaces between the spaced apart boards and held securely therein by the groove structure itself and, optionally, also by a resilient thermally conductive filler material therein.

As shown in FIG. 8, for the on top of the sub-floor installation, the part of the sub-floor in the room that is not completely covered by the holder boards of the courses must be brought up to the level of the part that is covered, by pieces such as 88.

RWH —Tubing Horizontal Over Wall Studs

Figures 9, 10, 11:
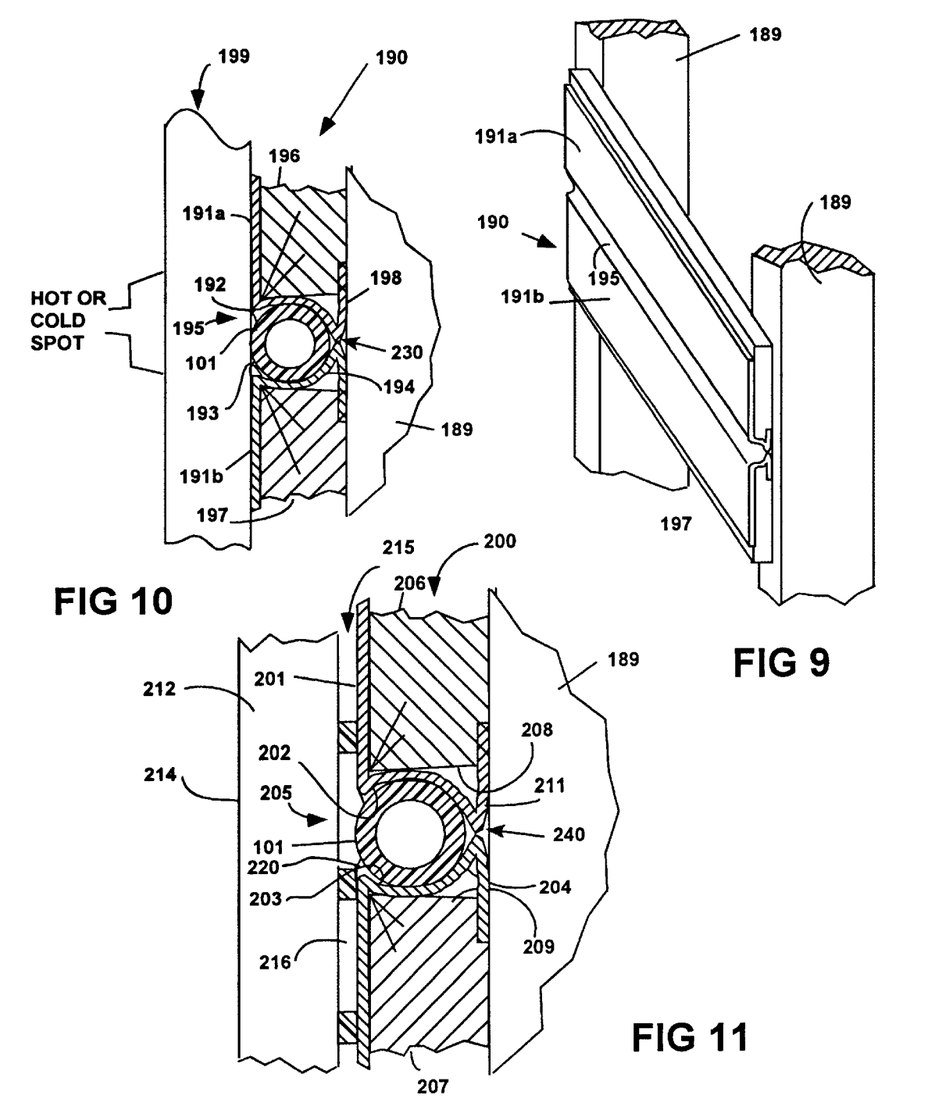
FIG. 9 is a perspective view of a RWH installation on the wall studs showing a course of boards with edge pieces of the second type and ready for inserting the tubing.
FIG. 10 is an enlarged end view of the RFH installation on tye wall studs shown in FIG. 9.
FIG. 11 is a further enlarged end view showing the RWH installation of FIGS. 9 and 10 with a thermal barrier between the installation and the finished wall covering to reduce hot spots a described in the applicants above mentioned pending U.S. application Ser. No. 80/862,441.

Part of a typical wood frame construction wall structure is shown in FIGS. 9 to 11 and includes, studs 189 usually spaced apart 16" on center. Courses of panels, each of two holder boards with edge pieces abutting and ready for insertion of the tubing are preferably installed horizontally on the wall studs using the second type of metal edge pieces that provide the radiation plate and metal groove into which the tubing is inserted from the exposed side of the panel, against which the finished wall covering is attached.

A panel using the second type metal edge pieces is shown in FIGS. 9 to 11. A horizontal installation showing one panel 190 on the studs 189 of a wall is illustrated in FIGS. 9 and 10 and the installation is completed when the tubing is inserted and the finished wall covering 199 is attached to the panels.

The panel 190 is an assembly of radiation plate edge pieces 191a and 191b and holding boards 196 and 197, which may be plywood, particle board or other rigid material, about the same thickness as the outside diameter of the tubing 101 that is inserted into the panel metal groove. The two boards 196 and 197 hold the radiation plate edge pieces 191a and 191b abutting each other at 230 and so they form a uniform longitudinal metal groove or slot 195 the length thereof and the tubing fits snugly into the metal groove.

Thus, the metal plate and groove can be made of two matching metal edge pieces such as shown in FIGS. 4 to 6 bent to the form shown in FIG. 6 so that when attached to the edges of boards 196 and 197 and abutted at 230 at installation, as shown, they provide metal groove 195 having sides 192 and 193 and bottom 194. As shown in FIG. 10, the groove 195 fits between the spaced apart boards 196 and 197 and defines a loop, which is as deep as the thickness of the boards and in which the tubing 101 fits at installation. The plate is made of highly thermally conductive material such as aluminum, copper or steel.

FIG. 11 shows a variation of the installation shown in FIGS. 9 and 10 using the second type of edge pices shown in FIGS. 4 to 6. Here, the panel 200 is an assembly of radiation plate edge pieces 201a and 201b and their respective holding boards 206 and 207, which are about the same thickness as the outside diameter of the tubing 101 that is inserted into the elongated metal groove 205 of the plate, formed when the edge pieces abut at 240. The two boards 206 and 207 support the radiation plates of edge pieces 201a and 201b and the tubing fits snugly into metal slot 205 that is so formed.

A thermal barrier comprised of a grid structure 215 may be provided between the installed courses, like course 200, in which the tubing 101 has been inserted, with or without thermally conductive resilient filler 203, and the finished wall covering 212 so that direct thermal contact of the tubing and radiation plate with the finished wall covering is reduced and trapped air spaces 216 are formed. By reducing direct thermal conduction between the tubing and the finished wall covering, the wall covering surface 214 has less temperature variation across it. For example, for RWH and RCH, the temperature on the surface of the finished covering immediately over the tubing is likely to be significantly higher than elsewhere. The grid structure creates trapped air spaces 116 are thermal barrier to direct thermal conduction. The result is that shot spots" on the finished wall or ceiling covering surface are diminished or eliminated and the surface temperature thereof is more even and comfortable.

A similar result is achieved for RWC and RCC where the temperature of the finished covering immediately over the tubing is likely to be significantly colder than elsewhere. Here again, a thermal barrier to direct heat conduction is provided by the grid structure 215 which creates trapped air spaces 216 between the panels and tubing and the finished covering and the trapped air spaces are thermal barriers to direct thermal conduction. The result is that "cold spots" on the finished covering surface are reduced, the surface temperature is more even and comfortable and condensation on the surface during humid conditions is less likely.

RCH/RCC—Panels And Tubing Across Rafters

Radiant hydronic cooling described herein is effective when installed in the ceiling, because the cooled air against the ceiling falls to the floor creating a convection flow that is favorable to providing even cooling throughout the room. In typical wood frame construction the ceiling of a room before the finished ceiling is installed is bare rafters, joists or strapping. Such a ceiling installation would be essentially the same as the wall installation shown in FIG. 9 to 11, except it would be on the rafters, joists, etc. of the ceiling instead of the wall studs as in those Figures.

Modified (Deeper) First Type Of Edge Pieces

Figure 12:
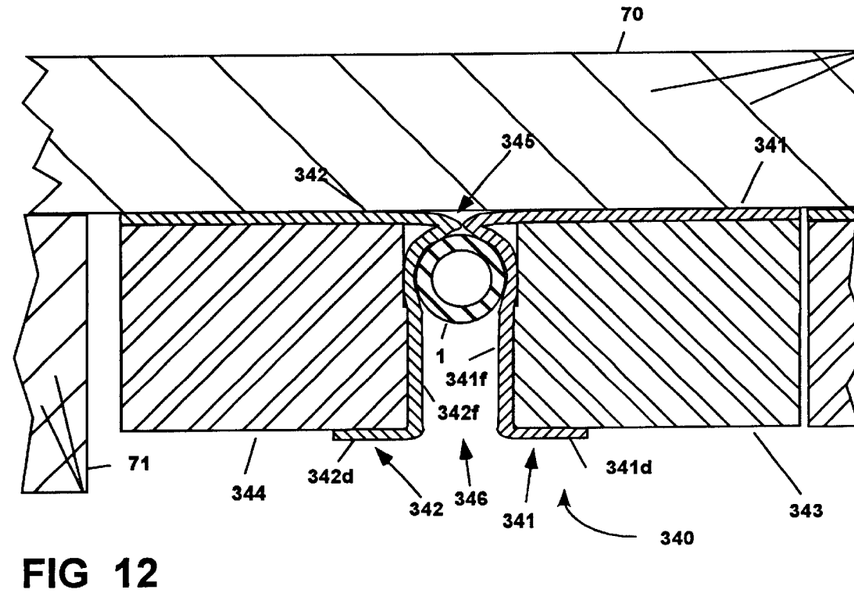
FIG. 12 shows a third type of edge pieces attached to side-by-side holder boards of foam insulation and with the edge pieces abutting each other and providing, in combination, a long (deep) metal groove between the boards into which the tubing is inserted and held snugly, the installation being underneath the sub-floor between floor joists and the foam boards serving also as a thermal barrier (insulation) between the radiation plate and the room below.

FIG. 12 is an enlarged end view of edge pieces of a modified (deeper) first type of two piece metal radiation sheet that is formed of two matching edge pieces 341 and 342 attached to side-by-side holder boards 343 and 344, respectively, and with the edge pieces abutting each other at 345 and providing, in combination, a metal groove 346 between the boards into which the tubing 1 is inserted and held snugly, the installation forming the modular panel 340 underneath the sub-floor 70. The sub-floor is supported by floor joists such as 71.

These modified edge pieces accommodate a relatively thicket board that is, for example, a highly thermally insulating board of plastic foam material, sometimes called "rigid insulation board" that may be an inch or more thick. Such rigid insulation board is relatively light weight as compared to plywood and while it is rigid, it cannot bear weight and so is used here for installations of panels under the sub-floor for RFH or between the studs for RWH. The thermal insulation provided by such a board is most desirable for under the sub-floor installation as a barrier to heat flow from the panel to the floor below and since it can be several inches thick, a greater R value is gained. This also applies to a wall installation where it is preferred to attach the panels of such rigid insulation board between the studs rather than across two or more studs, because the added thickness of the rigid insulation board increases the wall thickness more than can be tolerated.

Figure 13:
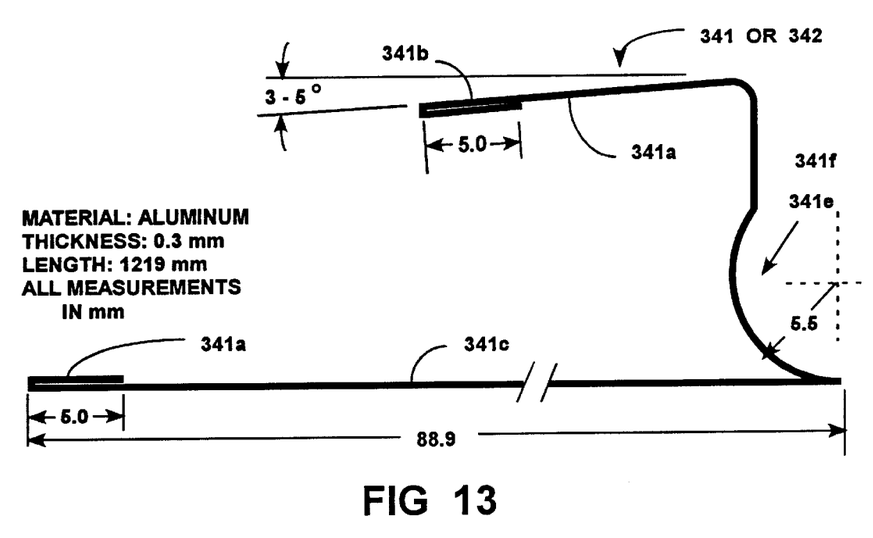
FIG. 13 is an edge view of an elongated metal sheet of aluminum that has been formed using sheet forming tools and special dies to provide an edge piece of the first type that is installed as described in FIG. 12.

FIG. 13 is an end view of an elongated metal sheet of aluminum that has been formed using sheet forming tools and special dies to provide an edge piece of the modified (deeper) first type that is installed as described in FIG. 12 and denoted 341 and 342 therein. The material is aluminum stock as described in the figure and may be formed with the dimensions shown in millimeters (mm). The long edges such as 341a and 341b of the formed edge piece are folded double to add strength and rigidity to the piece. The radiation plate is for the most part provided by part 341c which measures 102 mm by 1219 mm for each four foot length of such edge piece. Part 341d is provided primarily as a spring that plays against the holder board to urge part 341c against the board so that the holder board is gripped by the edge piece and so it is secured to the board without further attachments. Part 341e is shaped to combine with the opposing edge piece to provide a snug fit for the tubing 1 that is inserted into the groove 346 that is formed at installation when the opposing edge pieces abut. The greated depth of the groove 346 is provided by part 341f of edge piece 341 and by 342f of edge piece 342

CONCLUSIONS

While the invention described herein is described in connection with several preferred embodiments, it will be understood that it is not intended to limit the invention to those embodiments. It is intended to cover all alternatives, modifications, equivalents and variations of those embodiments and their features as may be made by those skilled in the art within the spirit and scope of the invention as defined by the appended claims.

What is claimed is:

1. In a hydronic heating system including a heating element that is a length of tubing that conducts water mounted in a wall, floor or ceiling of an area heated by said system against a radiating metal plate, two spaced apart boards for holding said metal plate and providing an elongated space for holding said length of tubing adjacent said plate, said tubing being inserted into said space against said plate, the improvement comprising:
   (a) said metal plate is provided in two separate pieces, each of which is attached to an edge of one of said spaced apart boards,
   (b) said two separate pieces provide a metal groove that projects into said elongated space and (c) said metal groove accommodates the insertion therein of said tubing from one side thereof so that the tubing is held therein in intimate thermal contact with said plate metal,
   (d) whereby said plate is heated by conduction of heat from said tubing and radiates heat to said area.

2. A hydronic heating system as in claim 1 wherein:
   (a) said plate has length, width and thickness and said length and width define a radiating surface of said plate and
   (b) said plate is mounted in said floor, wall or ceiling oriented with said radiation surface thereof parallel to said floor or wall surface adjacent thereto.

3. A hydronic heating system as in claim 2 wherein:
   (a) said two separate pieces each provide part of said radiating metal plate and part of said metal groove.

4. A hydronic heating system as in claim 3 wherein:
   (a) said two separate pieces each has a uniform cross-section shape transverse to the length thereof.

5. A hydronic heating system as in claim 4 wherein:
   (a) said two separate pieces each has the same uniform cross-section shape transverse to the length thereof.

6. A hydronic heating system as in claim 5 wherein:
   (a) said two separate pieces are substantially the same.

7. A hydronic heating system as in claim 6 wherein:
   (a) said two separate pieces are interchangeable.

8. A hydronic heating system as in claim 3 wherein:
   (a) said two separate pieces are each made of a unitary sheet of metal.

9. A hydronic heating system as in claim 3 wherein:
   (a) said two separate pieces each also provides means for securing said radiating plate part thereof against said board to which it is attached.

10. A hydronic heating system as in claim 9 wherein:
    (a) for said two separate pieces, said means for securing said radiating plate part thereof against said board acts as a spring to compel said radiating plate part against said board to which said piece is attached.

11. A hydronic heating system as in claim 10 wherein:
    (a) for said two separate pieces, the area of said radiating plate part thereof is substantially greater than the area of said means for securing thereof.

12. A hydronic heating system as in claim 10 wherein:
    (a) said two spaced apart boards each has length, width and thickness and said boards are the same thickness.

13. A hydronic heating system as in claim 12 wherein:
    (a) for each of said two separate pieces, said means for securing said radiating plate part thereof against said board and said radiating plate part are spaced apart evenly to match the thickness of said boards.

14. A hydronic heating system as in claim 9 wherein:
    (a) said two separate pieces each provide said part of said metal groove, said radiating plate part and said means for securing part.

15. A hydronic heating system as in claim 14 wherein:
    (a) all of said parts of each of said two separate pieces is made of a unitary sheet of metal.

16. A hydronic heating system as in claim 15 wherein:
    (a) said unitary sheet of metal is of uniform thickness.

17. A hydronic heating system as in claim 9 wherein:
    (a) said two separate pieces are so formed that when attached to the edges of said spaced apart boards and laid on a surface with the separate pieces abutting, said metal groove is provided for holding said tubing in intimate thermal contact with said radiating metal plate.

18. A hydronic heating system as in claim 2 wherein:
(a) said boards hold said plate radiating surface on the opposite side thereof from said length of tubing.

19. A hydronic heating system as in claim 2 wherein:
(a) said boards hold said plate radiating surface on the same side thereof as said length of tubing.

20. A hydronic heating system as in claim 12 wherein:
(a) said boards thickness is substantially greater than the outside diameter of said tubing and said boards are made of highly thermally insulating material.

* * * * *